June 19, 1945. H. O. QUARTZ 2,378,727

ELECTRODE HOLDER

Filed May 14, 1943

Inventor
H. O. Quartz
by K. S. Wyman
Attorney

Patented June 19, 1945

2,378,727

UNITED STATES PATENT OFFICE 2,378,727

ELECTRODE HOLDER

Herbert O. Quartz, West Allis, Wis., assignor to Allis-Chalmers Manufacturing Company, Milwaukee, Wis., a corporation of Delaware Application May 14, 1943, Serial No. 486,937

6 Claims. (Cl. 219—8)

This invention relates to the holders employed by arc welding operators for supporting and manipulating the metal depositing electrode during the welding operation and more particularly to the type of holder to which the electrode is attached by welding instead of by mechanical means.

In a known construction of this type, the part of the holder to which the electrode is welded is detachably secured to the shank which is covered by a tube of fibrous insulating material to form the handle of the holder. However, this known construction is not entirely satisfactory since the detachable connection between the shank and the part to which the electrode is welded materially increases the resistance losses and the temperature of the handle portion and since the proximity of said part and handle portion subjects the latter and the operator's hand thereon to the intense heat of the welding arc when the electrode becomes short. In addition, the proximity of said part and handle portion renders the holder unbalanced by the electric cable connected thereto and therefore difficult to hold and manipulate.

The primary object of this invention is to provide an improved construction for the above designated type of holder which is effective to materially reduce the resistance losses and the temperature of the handle portion thereof.

A further object of this invention is to provide a simplified electrode holder of said type which is extremely durable and inexpensive to manufacture.

In accordance with this invention, one or more of the above stated objects or parts thereof may be accomplished by a construction embodying one or more of the following features: (1) an elongated rigid electrical conductor having therein a passage placing the opposite end portions thereof in communication with each other and one of said end portions in communication with the atmosphere; (2) means fixedly connected to or formed on said one end portion presenting at least one surface to which the end of an electrode can be readily welded; (3) an electrically conductive shank rigidly connected to the other one of said end portions and embodying means for connecting an electrical conductor thereto; (4) insulating material attached to and surrounding the shank in passage forming relation thereto; and (5) means including a passage in said shank placing said other end of the rigid member in communication with the atmosphere.

Accordingly, the invention consists of details of construction, combinations of elements and arrangements of parts as is more fully set forth in the appended claims and in the detailed description, reference being had to the accompanying drawing, in which:

Figure 1:
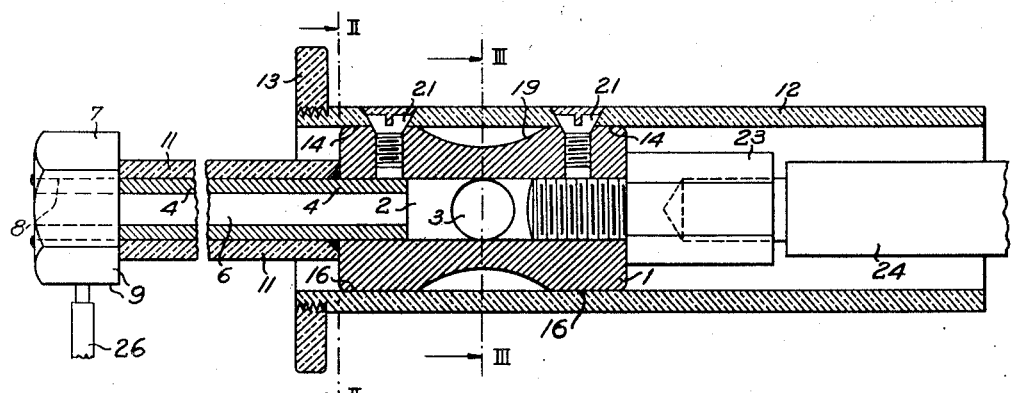
Fig. 1 is a longitudinal section through a weld-attached electrode holder embodying the invention.

Referring particularly to Fig. 1, it is seen that apparatus embodying the invention may comprise a shank 1 having communicating or intersecting passages 2 and 3 extending longitudinally and transversely therethrough, respectively, a rigid piece of electrically conductive pipe or tubing constituting an elongated rigid electrical conductor 4 having a passage 6 extending longitudinally therethrough, an electrically conductive member or nut 7 having an opening 8 extending therethrough and one or more plain side surfaces 9 to which an end of an electrode can be readily welded, a tube of insulating material 11 surrounding the portion of conductor 4 intermediate the nut 7 and shank 1, a tube of insulating material 12 attached to and surrounding said shank in partially spaced handle-forming relation thereto, and a transverse member or rest 13 formed of insulating material and secured to the rigid conductor end of the tube 12 for keeping the nut 7 on the conductor 4 out of engagement with a plane electrically conductive surface on which the holder may be placed.

Figure 2:
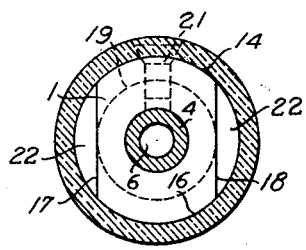
Fig. 2 is a transverse section taken on line II—II of Fig. 1.
Figure 3:
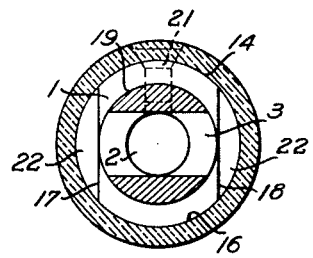
Fig. 3 is a transverse section taken on line III—III of Fig. 1.

The shank 1, particular reference being had to Figs. 2 and 3, is preferably formed to present end portions each having four side walls comprising a pair of opposite cylindrical surface portions 14 and 16 and a pair of opposite plane surface portions 17 and 18 and a reduced intermediate cylindrical portion 19 which merges with the plane and cylindrical surface portions at the ends thereof as shown. The handle forming tube 12, which surrounds the shank 1, engages the end cylindrical surface portions 14 and 16 thereof and is secured thereto by means of set screws 21 which are preferably countersunk and their heads covered with insulating material as indicated; said tube forming with the plane side surface portions 17 and 18 and with the reduced intermediate portion 19 a pair of longitudinally extending passages 22 having opposite ends thereof open to the atmosphere. The transverse passage 3 in shank 1 opens through the intermediate portion 19, thereby placing the longitudinal passage 2 therein in communication with the atmosphere through the passages 22.

Tubular conductor 4 extends within the front end of the longitudinal passage 2 in shank 1 and is preferably brazed or otherwise permanently secured therein to provide a low resistance connection placing the longitudinal passage 6 in tube 4 in continuous communication with the longitudinal passage 2 in shank 1. In assembling the holder, insulating tube 11 is then slid over the conductor 4 and the member or nut 7 is then slid over the exposed end of conductor 4 and preferably brazed or otherwise permanently secured thereto as indicated with the opening 8 therein communicating with and placing the outer end of passage 6 in conductor 4 in communication with the atmosphere. The rear end of the longitudinal passage 2 in shank 1 is internally threaded and has secured therein a cable connector 23 which closes the rear end of passage 6 and which is in turn soldered or otherwise permanently connected to a flexible electric cable or conductor 24 constituting a suitable source of electrical energy.

The end of an electrode 26 can be readily welded to a selected surface on the member 7 as indicated, or if desired, to each of said surfaces; the latter procedure being commonly employed when an operator desires to make a continuous weld without appreciable interruption. The manner in which the end of the electrode is welded to such a surface is well known in the art, and a further description in this connection is deemed unnecessary for a complete understanding of the invention. When the electrode or electrodes, if more than one is employed, are substantially completely used, the remaining portion or nub may be readily removed from the surface on member 7 simply by hooking the nub over an insulated member and jerking same thereagainst, which breaks the nub from said surface. If after continued use, the surface or surfaces on member 7 become sufficiently rough to render attachment of the electrode thereto difficult, said surface or surfaces can be readily reconditioned by a grinding operation. Moreover, if desired, the member 7 can be removed by heating same sufficiently and a new one brazed or otherwise secured to conductor 4 as previously stated.

In the construction herein shown and described, the opening in member 7, the passage 6 in conductor 4, the passages 2 and 3 in shank 1 and the passages 22 formed between the handle-forming tube 12 and shank 1 provide a continuous passage for the circulation of air therethrough. The end of the holder to which the electrode is attached becomes quite hot and since the holder is rarely held in an exact horizontal position for any length of time in performing welding operations, there is a substantially continuous gravity circulation of air therethrough; the direction of circulation depending upon which end of the holder is in the higher position. This continued circulation of air effects an appreciable cooling action which materially reduces the temperature of the conductor 4 and of the handle portion comprising shank 1 and tube 12 irrespective of the current value being used. The electrical resistance of the current conducting parts of the holder increases as the temperature thereof increases and consequently, a reduction in the temperature of such parts materially reduces the resistance or $I^2R$ losses therein, thereby rendering the holder more efficient. Moreover, a reduction in the temperature of the handle portion of the holder which is effected by said cooling action and the spacing of said portion from the electrode holding portion or member 7 permits continued use of the holder for long periods of time even when high current values are employed. In addition, spacing of the handle portion from the electrode holding portion 7 thereof provides a better balanced holder which facilitates manipulating same.

Certain features of the invention are applicable to electrode holders generally and although all features of the invention are particularly applicable to the type of holder to which the electrode is attached by welding instead of by mechanical means, it should be understood that the rigid conductor 4 may itself be formed to present spaced electrode attaching and handle portions, that the electrode may be mechanically attached to an end portion of the conductor 4 or to a means carried thereby, that the longitudinal passage therein may terminate in a transverse portion extending through the wall thereof, thereby placing one or both ends of said conductor in communication with the atmosphere for the gravity circulation of air therethrough, and that therefore it is not intended to limit the invention to the exact details of construction herein shown and described as various modifications within the scope of the appended claims may occur to persons skilled in the art.

It is claimed and desired to secure by Letters Patent:

1. An electrode holder comprising an elongated rigid electrical conductor having a passage extending longitudinally therethrough, an annular electrically conductive member coaxially secured to one end of said rigid conductor in non-obstructing relation with respect to the adjacent end of said longitudinally extending passage, said member having a plain exterior surface adapted to have one end of an electrode welded thereto, and an electrically conductive shank rigidly connected to the opposite end of said rigid conductor and embodying means for connecting an electrical conductor thereto, said shank having a passage therein placing the adjacent end of the passage in said rigid conductor in communication with the atmosphere.

2. An electrode holder comprising an elongated rigid electrical conductor having a passage extending longitudinally therethrough, an annular electrically conductive member coaxially secured to one end of said rigid conductor in non-obstructing relation with respect to the adjacent end of said longitudinally extending passage, said member having a plain exterior surface adapted to have one end of an electrode welded thereto, an electrically conductive shank having one end rigidly connected to the opposite end of said rigid conductor and having at its other end means for connecting an electrical conductor thereto, insulating material attached to and surrounding said shank in handle-forming relation thereto, and means including a passage in said shank placing the adjacent end of the passage in said rigid conductor in communication with the atmosphere.

3. An electrode holder comprising an elongated rigid electrical conductor having a passage extending longitudinally therethrough, an annular electrically conductive member coaxially secured to one end of said rigid conductor in non-obstructing relation with respect to the adjacent end of said longitudinally extending passage, said member having a plain exterior surface adapted to have one end of an electrode welded thereto, an electrically conductive shank having one end rigidly connected to the opposite end of said rigid conductor and having at its other end means for connecting an electrical conductor thereto, insulating material attached to and surrounding said shank in partially spaced handle-forming relation thereto, and means including the space between said insulating material and shank and a passage in said shank placing the adjacent end of the passage in said rigid conductor in communication with the atmosphere.

4. An electrode holder comprising an elongated rigid electrical conductor having a passage extending longitudinally therethrough, an electrically conductive electrode-mounting member operatively carried by one end of said conductor in nonclosing relation with respect to said longitudinal passage, said member presenting at least one substantially plain exterior surface adapted to have one end of an electrode welded thereto, and an electrically conductive shank having one end rigidly secured to the other end of said rigid conductor and having at its other end means for connecting an electrical conductor thereto, said shank having a passage therein forming a continuation of and placing the shank end of said longitudinal passage in communication with the atmosphere.

5. An electrode holder comprising an elongated electrically conductive shank having a passage extending longitudinally therethrough, means securing an electrical conductor in and closing one end of the longitudinal passage in said shank, a rigid tubular electrical conductor having one end fixedly disposed within the opposite end of the longitudinal passage in said shank and having its opposite end provided with a substantially plain exterior surface adapted to have one end of an electrode welded thereto, a sleeve of insulating material covering substantially all of said tubular conductor with the exception of said plain electrode engaging surface, insulating material attached to and surrounding said shank in partially spaced handle-forming relation thereto, and means including the space between said insulating material and shank and an additional passage in said shank placing the longitudinal passage therein in communication with the atmosphere.

6. An electrode holder comprising an elongated electrically conductive shank having a passage extending longitudinally therethrough, means securing an electrical conductor in and closing one end of the longitudinal passage in said shank, a rigid tubular electrical conductor having one end fixedly disposed within the opposite end of the longitudinal passage in said shank and having its opposite end provided with a substantially plain exterior surface adapted to have one end of an electrode welded thereto, insulating material attached to and surrounding said shank in partially spaced handle-forming relation thereto, and means including the space between said insulating material and shank and an additional passage in said shank placing the longitudinal passage therein in communication with the atmosphere.

HERBERT O. QUARTZ.